Dec. 29, 1931.  L. D. SOUBIER  1,838,162
APPARATUS FOR PRODUCING TUBULAR GLASS
Original Filed Feb. 18, 1928   2 Sheets-Sheet 1
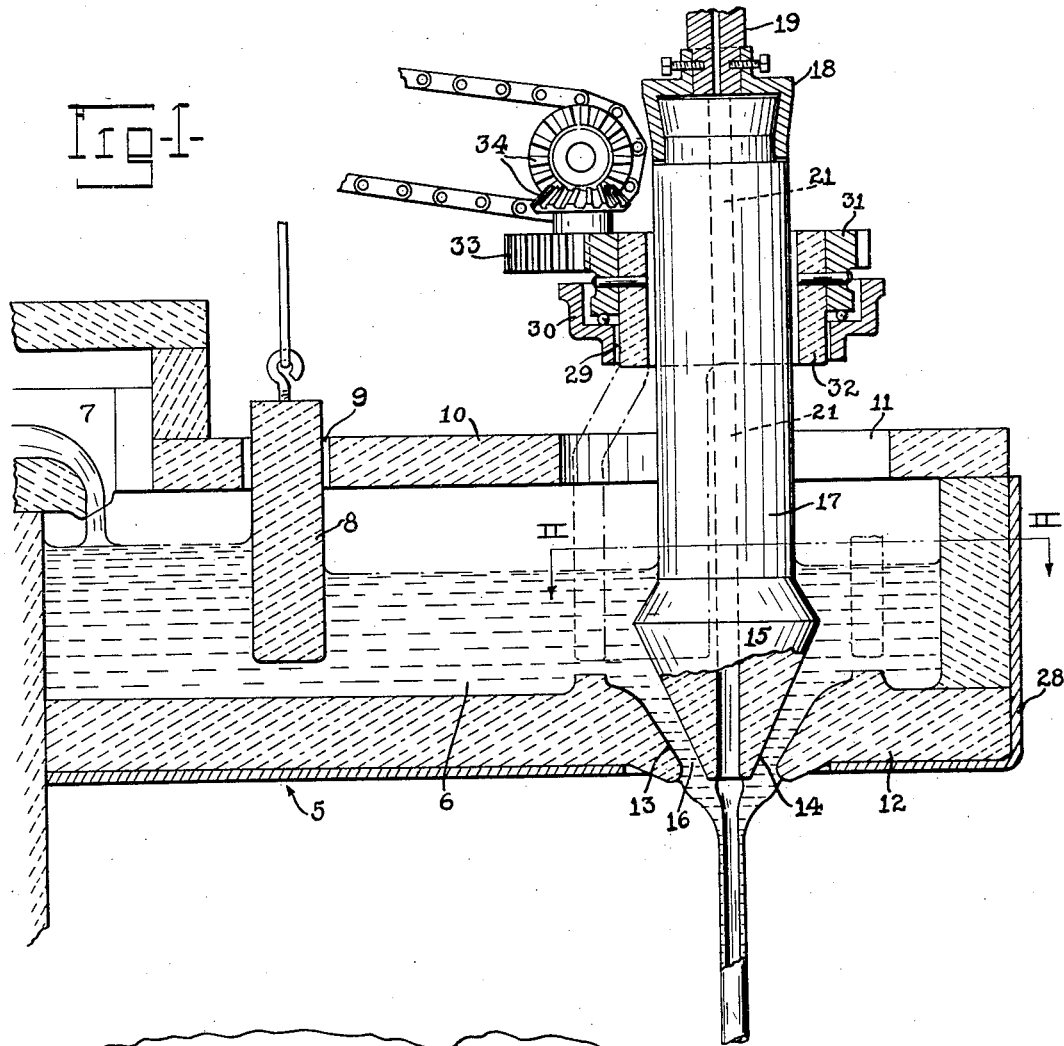
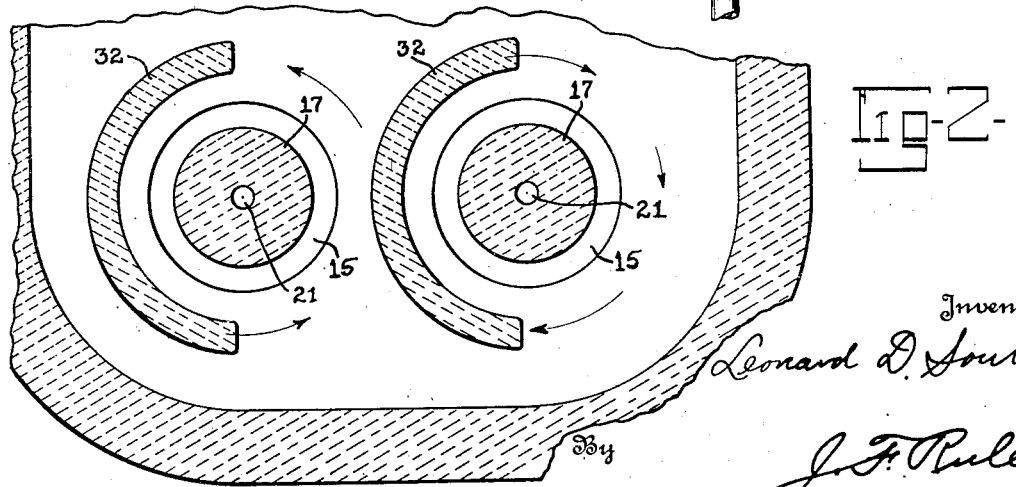

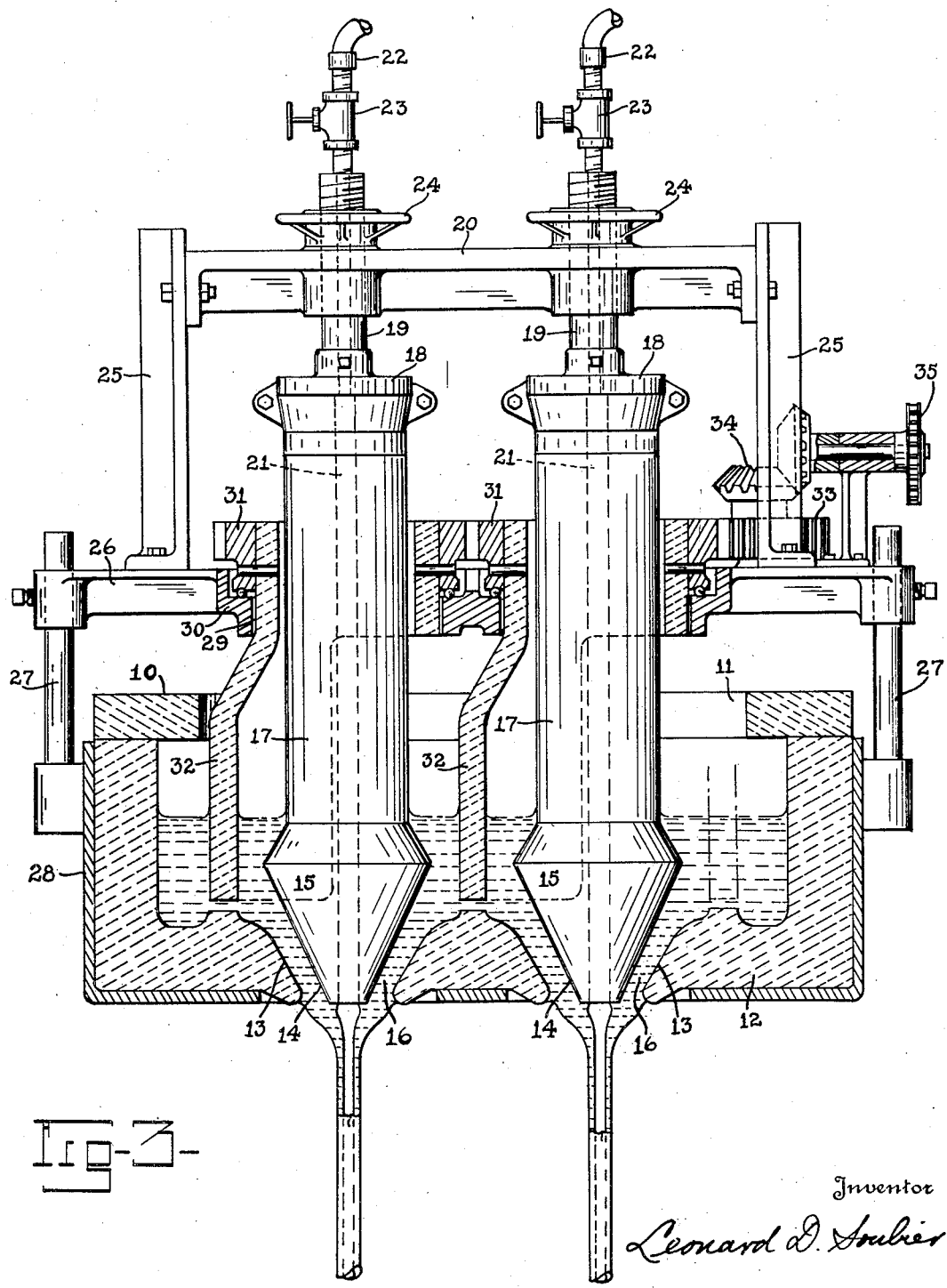

Patented Dec. 29, 1931

1,838,162

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

APPARATUS FOR PRODUCING TUBULAR GLASS

Application filed February 18, 1928, Serial No. 255,222. Renewed May 2, 1930.

The present invention relates to improvements in apparatus for producing tubular glass and has for an object the provision of means whereby vari-sized tubing may be simultaneously drawn from a single supply body or pool of molten glass. To this end, the invention consists in providing a furnace extension or boot functioning as a container for the pool from which the tubing is drawn and provided with a pair of bottom outlet openings arranged side by side, the walls of said openings cooperating with suitable mandrels in shaping the issuing glass.

Another object is to provide a multiple tube producing apparatus of the above character embodying novel glass stirring or agitating implements individual to the mandrels about which they rotate, said implements being of such character that the mandrels and outlets may be disposed in exceptionally close relation to each other without causing interference in operation of the stirring implements. Thus, the tubing may be drawn from substantially the center of the supply body, such portions comprising that glass best conditioned for working and substantially, if not entirely, free from chilled areas.

Other objects will be apparent hereinafter.

In the accompanying drawings:

Fig. 1 is a vertical longitudinal sectional view of the apparatus.

Fig. 2 is a horizontal sectional view taken substantially on the line II—II of Fig. 1.

Fig. 3 is a transverse sectional view with parts shown in elevation.

In the drawings, the furnace extension or boot 5 containing the pool or supply body of molten glass 6 is formed with an inlet 7 at its inner end through which molten glass passes from the furnace or tank (not shown) to said container 5. Passage of glass to the front end of the extension or boot 5 is controlled by a gate 8 which projects into the glass by way of an opening 9 in the boot cover 10, said gate in addition to controlling the forward flow of the glass, functioning as a skimmer. This gate 8 may be adjusted vertically to the desired elevation to meet the demands of varying operating conditions. For example, if glass is being drawn from the supply body at a high rate of speed, it becomes necessary to raise the gate to permit a more rapid forward movement of glass in the container 5. The front end portion of the cover 10 is formed with an opening 11 through which portions of the tube forming elements extend for projection into the pool of molten glass.

According to the present embodiment of the invention, the floor 12 of the boot 5 is provided with a pair of transversely spaced bottom outlet openings whose walls 13 converge downwardly and cooperate with the downwardly converging walls 14 of mandrels 15 in providing annular passageways 16 through which the molten glass issues and from the walls of which the glass is drawn by suitable mechanism (not shown) into tubular form. These bottom outlet openings, for reasons hereinafter pointed out, are arranged quite close to each other and near the longitudinal center of the boot. Thus, glass issuing through the annular passageways 16 is drawn from the hottest and best conditioned glass contained in the boot, such glass being practically free from chilled streaks and the like which would be detrimental to the production of quality goods.

The mandrels 15 are integrally formed with supporting stems or rods 17, which, together with the mandrels, are constructed from suitable refractory material. These stems 17 have their upper ends removably held in chucks 18, the latter carrying externally screw threaded connector rods 19 which extend upwardly through a transverse supporting bar 20. The connector rods 19 and the mandrels 15 with their integral stems 17 are formed with axial openings 21 through which air pressure is directed to the interior of the tubing being formed. Supply pipes 22 may be connected to the upper ends of the rods 19 and provided with valves 23 to control the passage of air pressure into said passageways 21. Thus, the degree of air pressure supplied internally of the tubing may be readily controlled.

Hand wheels 24 are threaded upon the connector rods 19 above the transverse supporting bar 20 and bear against the upper side of said bar to thereby support the mandrels 15 at various elevations as determined by the size of the tubing being produced. Uprights 25 are connected at their upper ends to the outer ends of said transverse supporting bar 20 and rest upon a main base bar 26 which extends transversely above the boot 5 in vertical alignment with said cross bar 20. This transverse base bar 26 is vertically adjustable on supporting rods 27 whose lower ends are suitably connected to the casing 28 which partially encloses the boot.

The transverse base bar 26 is formed with a pair of spaced vertical openings 29 axially aligned with the bottom outlet openings in the boot 5 and formed with upwardly facing ball races 30 on which series of anti-friction balls are disposed. A pair of spur gears 31 running in mesh with each other, carry collars which rest upon the anti-friction balls in said races, said collars being suitably connected to glass stirring or agitating implements 32. Each of these implements, according to the present disclosure, comprises a semi-circular wall of refractory material projecting downwardly into the glass at one side of the mandrel 15. These walls 32 may be continuously or intermittently rotated about their axes which, as stated, coincide with the axes of the mandrels 15, to thereby maintain uniformity of temperature throughout the glass issuing through the bottom outlet openings. Because of the semi-circular formation of these walls 32, and the relation between said walls as shown in Figs. 2 and 3, there is no interference between said walls during their operation, although portions of the paths traversed by said walls coincide. By so constructing and operating the agitating implements, the bottom outlet openings, as previously stated, may be placed side by side and quite close to each other so that the issued glass is obtained directly from substantially the central area of the front end of the pool.

A driving pinion 33 runs in mesh with one of the spur gears 31 and receives its power from any suitable source by way of a pair of meshing bevel gears 34 and a sprocket 35. As previously stated, the driving means which transmits power to the sprocket wheel 35 may be of a character to continuously or intermittently rotate or, if desirable, oscillate the stirring implements 32.

Simultaneous and uniform vertical adjustment of the mandrels 15 may be effected by raising or lowering the base bar 26 (Fig. 3) which supports both the mandrels and the stirring implements. Such adjustment may also be obtained by rotation of the hand wheels 24 which bear against the upper side of the transverse supporting bar 20. Where the adjustment is effected by changing the elevation of the base bar 26, both the mandrels 15 and the stirring implements 32 are adjusted corresponding degrees. In order to produce two sizes of tubing on the apparatus illustrated, the hand wheels 24 will be manipulated to properly change the position of the tapered walls 14 of the mandrels 15 relative to the walls 13 of the bottom outlet openings. Such adjustment varies the area of the annular passageways 16 and thereby predetermines the wall thickness and size of the tubing. Vertical adjustment of the stirring implements 32 will, to a greater or less degree, affect the rate of flow of glass to the outlet openings.

From the above, it will be evident that the apparatus illustrated provides means for simultaneous production of several different sizes of tubing in addition to insuring embodiment in the tubing of glass drawn from those areas constituting the best conditioned glass in the container.

Modifications may be resorted to within the spirit and scope of the appended claims.

What I claim is:

1. The combination of a container for molten glass having a pair of bottom outlet openings positioned side by side near the center of the container, means to cause issue of glass through said openings in tubular form, and stirring implements rotating about the axes of said outlets, the paths of travel of the implements coinciding at points between the outlet openings.

2. The combination of a container for molten glass having a pair of bottom outlet openings positioned side by side near the center of the container, means to cause issue of glass through said openings in tubular form, and stirring implements rotating about the axes of said outlets, the paths of travel of the implements coinciding at points between the outlet openings, said implements each comprising substantially semi-circular walls projecting downwardly into the glass.

3. The combination of a container for molten glass having a pair of bottom outlet openings positioned side by side near the center of the container, means to cause issue of glass through said openings in tubular form, stirring implements rotating about the axes of said outlets, the paths of travel of the implements coinciding at points between the outlet openings, said implements each comprising substantially semi-circular walls projecting downwardly into the glass, and means to vary the elevation of said implements.

4. In combination, a container for molten glass having a pair of bottom outlet openings positioned side by side near the center of said container, said openings formed with downwardly converging walls, mandrels projecting downwardly into said openings and having tapered lower ends forming with the walls of the outlet openings annular passageways through which the molten glass issues, means to supply air through said mandrels to the interior of the issuing glass to give the latter tubular formation, glass stirring devices individual to the mandrels, and means to rotate said devices about the corresponding mandrels, the paths of travel of said devices coinciding at points between the outlet openings.

5. In combination, a container for molten glass having a pair of bottom outlet openings positioned side by side near the center of said container, said openings formed with downwardly converging walls, mandrels projecting downwardly into said openings and having tapered lower ends forming with the walls of the outlet openings annular passageways through which the molten glass issues, means to supply air through said mandrels to the interior of the issuing glass to give the latter tubular formation, glass stirring devices individual to the mandrels, means to rotate said devices about the corresponding mandrels, the paths of travel of said devices coinciding at points between the outlet openings, and means operable to vertically adjust the mandrels and stirring devices simultaneously and also operable to adjust the mandrels independently of the stirring devices.

6. In combination, a container for molten glass having a pair of bottom outlet openings positioned side by side near the center of said container, said openings formed with downwardly converging walls, mandrels projecting downwardly into said openings and having tapered lower ends forming with the walls of the outlet openings annular passageways through which the molten glass issues, means to supply air through said mandrels to the interior of the issuing glass to give the latter tubular formation, glass stirring devices individual to the mandrels, and means to rotate said devices about the corresponding mandrels, the paths of travel of said devices coinciding at points between the outlet openings, each of said stirring devices comprising a substantially semi-circular wall projecting downwardly into the glass adjacent one of the mandrels.

7. In combination, a container for molten glass having a pair of bottom outlet openings positioned side by side near the center of said container, said openings formed with downwardly converging walls, mandrels projecting downwardly into said openings and having tapered lower ends forming with the walls of the outlet openings annular passageways through which the molten glass issues, means to supply air through said mandrels to the interior of the issuing glass to give the latter tubular formation, a glass stirring devices individual to the mandrels, means to rotate said devices about the corresponding mandrels, the paths of travel of said devices coinciding at points between the outlet openings, and means to vertically adjust the mandrels independently of each other relative to the bottom outlet openings to thereby vary the areas of the passageways and regulate the size of the tubing produced.

8. In combination, a container for molten glass having a pair of bottom outlet openings positioned side by side, means to cause issue of glass through said openings in tubular form, stirring implements rotatable about the axes of said outlets, and means to rotate said implements in opposite directions, the paths of travel of the implements coinciding at points between said openings.

9. In combination, a container for molten glass having a pair of bottom outlet openings positioned side by side, means to cause issue of glass through said openings in tubular form, stirring implements rotatable about the axes of said outlets, means to rotate said implements in opposite directions, the paths of travel of the implements coinciding at points between said openings, and means to adjust said stirring implements vertically relative to the outlet openings.

10. In apparatus for making tubular glass, the combination of a container for molten glass having bottom outlet openings arranged side by side, non-rotating mandrels projecting downward into the glass over said openings, and stirring implements rotating in the glass about the axes of said openings respectively, with their paths of rotation overlapping.

11. In apparatus for making tubular glass, the combination of a container for molten glass having bottom outlet openings arranged side by side, non-rotating mandrels projecting downward into the glass over said openings, and stirring implements rotating in the glass about the axes of said openings respectively, in opposite directions, each of said implements during its rotation intersecting the path of movement of the other implement.

12. In apparatus for forming tubular glass, the combination with a main furnace tank, of a feeder boot or extension into which molten glass flows from said tank, said boot having bottom outlets extending through the floor thereof and symmetrically arranged on opposite sides of the longitudinal axis of said boot, mandrels projecting downward through the glass into said outlets, and stirring implements rotating horizontally in opposite directions in the glass about the axes of said mandrels respectively with their paths of rotation overlapping.

13. In combination a main furnace tank adapted to contain a supply body of molten glass, a lateral extension on the tank into one end of which molten glass flows from the tank, said extension comprising a single channel lengthwise through which the glass flows, said extension having a pair of bottom outlet openings adjacent the end remote from the tank, said openings arranged side by side on a line extending transverse to the direction of glass flow in said extension, mandrels projecting downward into the glass over said openings, and stirring implements individual to the mandrels and rotating in the glass in proximity to the mandrels in overlapping paths concentric with the respective mandrels.

14. In combination a main furnace tank adapted to contain a supply body of molten glass, a lateral extension on the tank into one end of which molten glass flows from the tank, said extension comprising a single channel lengthwise through which the glass flows, said extension having a pair of bottom outlet openings adjacent the end remote from the tank, said openings arranged side by side on a line extending transverse to the direction of glass flow in said extension, mandrels projecting downward into the glass over said openings, stirring implements individual to the mandrels each comprising an incomplete cylinder, and means to rotate said implements about the corresponding mandrels in overlapping paths.

15. In combination, a container for molten glass having adjacent bottom outlets, and stirring implements rotating in the glass over the outlet in overlapping closed paths.

16. In combination, a container for molten glass having adjacent bottom outlets, and stirring implements rotating in the glass over the outlet in overlapping closed paths, said implements being substantially semi-circular in form.

17. In comibnation, a container for molten glass having bottom outlet openings positioned side by side, implements projecting downward into the glass over said openings and substantially centrally thereof and controlling the discharge of glass through said openings, glass stirring devices individual to said implements, each comprising an incomplete cylinder partly surrounding and concentric with the corresponding implement, and means for rotating said stirring devices.

18. In combination, a container for molten glass having bottom outlet openings positioned side by side, implements projecting downward into the glass over said openings and substantially centrally thereof and controlling the discharge of glass through said openings, glass stirring devices individual to said implements, each comprising an incomplete cylinder partly surrounding and concentric with the corresponding implement, and means for rotating said stirring devices about the axes of the implements in overlapping paths of movement.

Signed at Toledo, in the county of Lucas and State of Ohio, this 15th day of February, 1928.

LEONARD D. SOUBIER.